April 14, 1925.  1,533,660
L. H. PURNELL
JIG FOR MAKING PIPE ELBOWS
Filed April 23, 1923    2 Sheets-Sheet 1
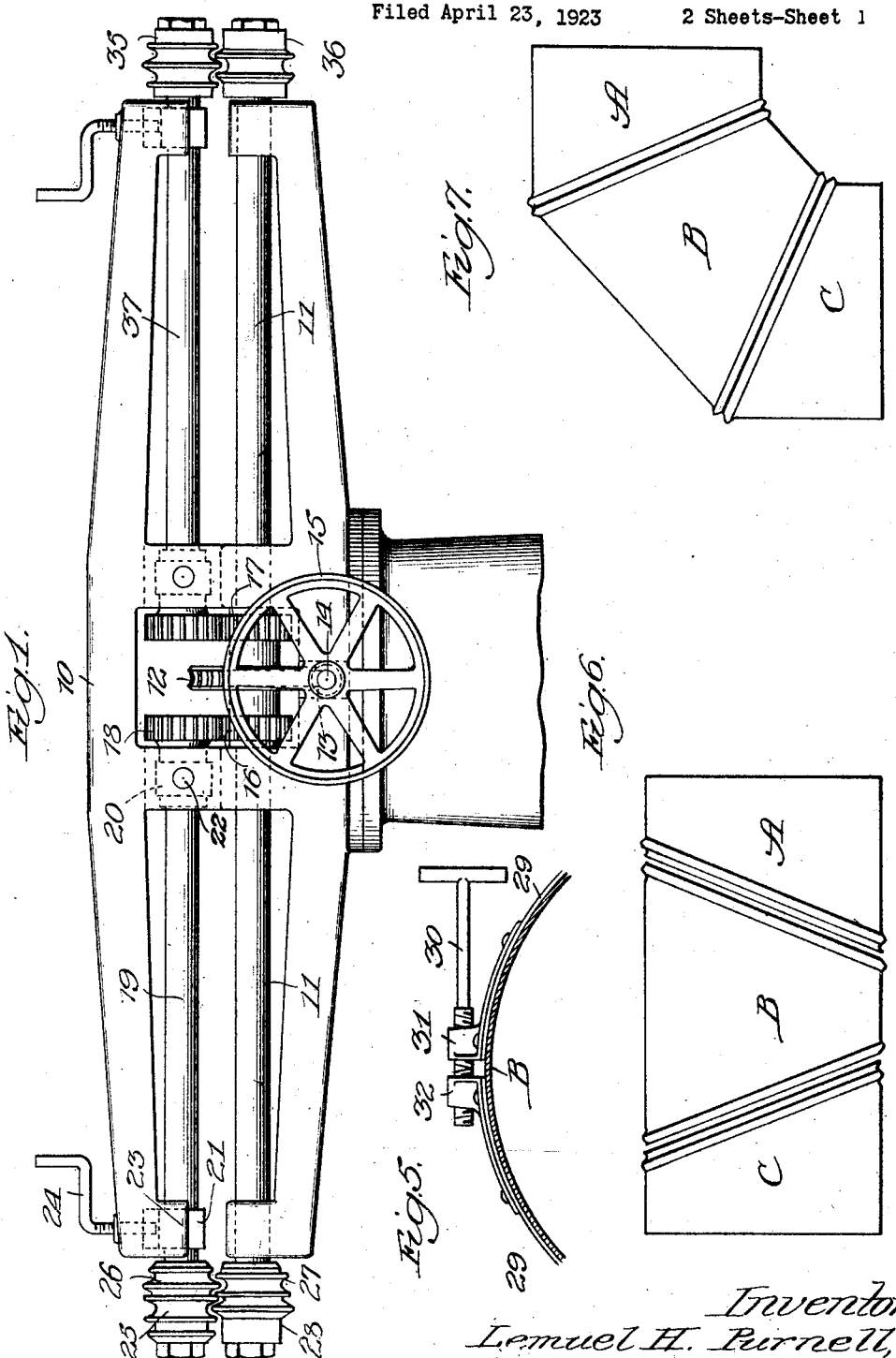
Inventor.
Lemuel H. Purnell,
By Dyrenforth, Lee, Chritton & Wiles,
Attys.

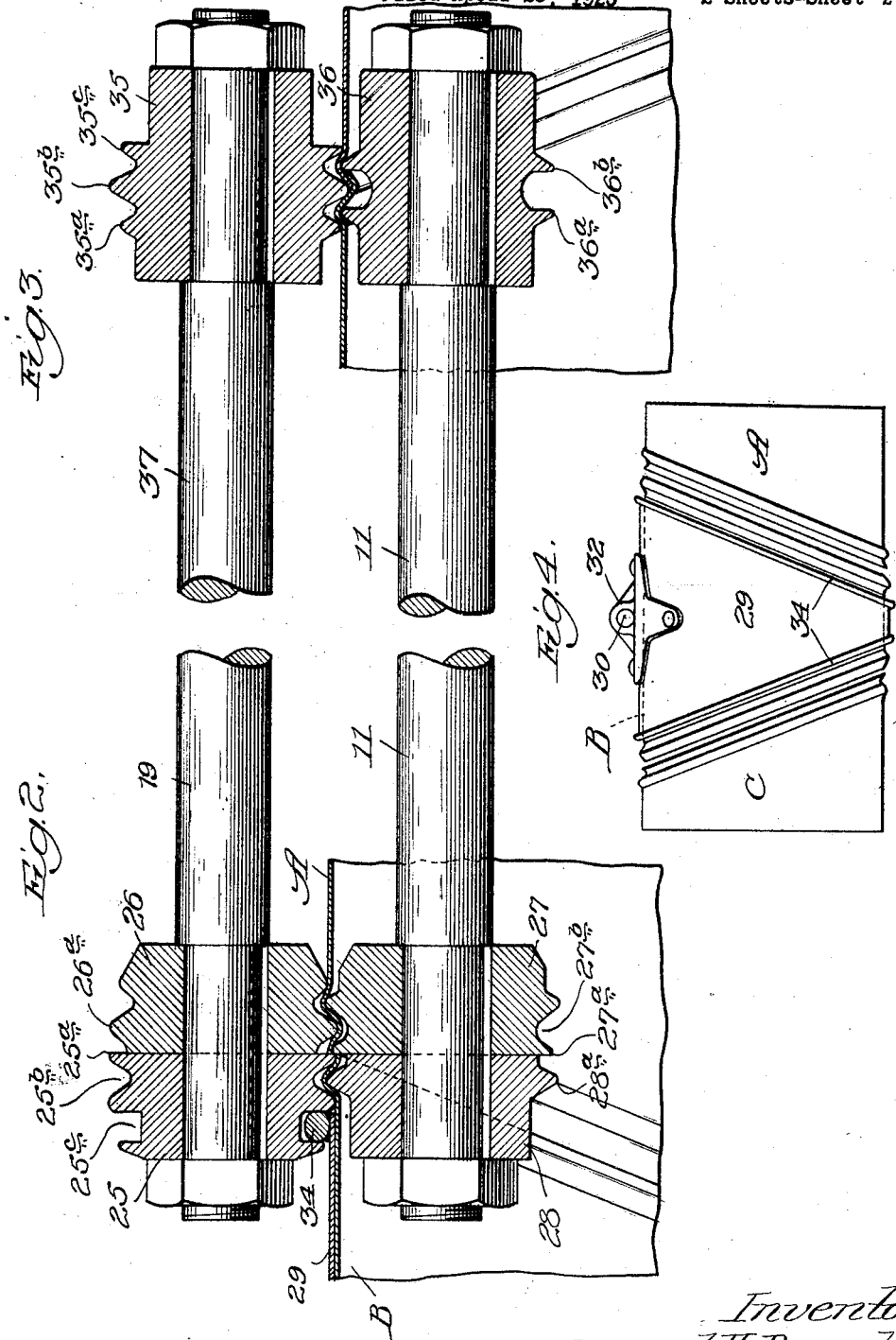

Patented Apr. 14, 1925.

1,533,660

UNITED STATES PATENT OFFICE.

LEMUEL H. PURNELL, OF CHICAGO, ILLINOIS, ASSIGNOR OF ONE-HALF TO HENRY G. GOELITZ AND ONE-HALF TO ENOCH PURNELL, BOTH OF OAK PARK, ILLINOIS.

JIG FOR MAKING PIPE ELBOWS.

Application filed April 23, 1923. Serial No. 633,986.

*To all whom it may concern:*

Be it known that I, LEMUEL H. PURNELL, a citizen of the United States, residing at Chicago, in the county of Cook and State of Illinois, have invented a new and useful Improvement in Jigs for Making Pipe Elbows, of which the following is a specification.

This invention relates to jigs for making pipe elbows and the like, and is fully described in the following specification and shown in the accompanying drawings, in which:

Fig. 1 is a front elevation of a machine embodying the invention;

Fig. 2 is an enlarged vertical section through the rotary cutters showing a pipe in the process of being cut;

Fig. 3 is a vertical section through the closing rollers showing two sections of pipe being rolled together;

Fig. 4 is a side elevation of a section of pipe showing the jig in place, both of the pipe elbow sections having been cut off;

Fig. 5 is an enlarged detail of the device for clamping the jig about the pipe;

Fig. 6 is a side elevation of three sections of a pipe elbow cut by this machine; and Fig. 7 is a side elevation of these same sections assembled and turned so as to form a pipe elbow.

The embodiment of the machine for carrying out this invention comprises a frame 10 of double C-type in which a shaft 11 is suitably journaled. A worm wheel 12 is keyed on this shaft and is driven by a worm 13 which in turn is keyed on the shaft 14 which is driven by a pulley from any suitable source of power.

The shaft 11 has keyed thereon spur-gears 16 and 17. The gear 16 meshes with a gear 18 keyed on the shaft 19 which is carried in bearings 20 and 21. The bearing 20 is preferably mounted to rotate about trunnions 22 while the bearing 21 is movable up and down in suitable guideways 23 by means of the threaded crank 24.

The shafts 11 and 19 have keyed thereon rotary cutters which are accurately held against longitudinal movement on the shaft, as shown in detail in Fig. 2. The upper cutter consists preferably of two sections 25 and 26, the former having a cutting edge 25$^a$ which passes a similar cutting edge 27$^a$ on the lower cutter 27 so that a sheet of metal placed therebetween will be cut into two sections A and B as shown in Fig. 2. A groove 27$^b$ is formed in the cutter 27 and a corresponding annular flange 26$^a$ is formed upon the cutting member 26 so as to form the ogee curve in the section A as shown in Fig. 2. A similar groove 25$^b$ is formed in the member 25 and a similar flange 28$^a$ is formed on the member 28 so as to form a reverse curve in the section B.

In order to make elbow sections which can be assembled as will later be explained it is necessary that the cuts between the sections A, B and C shall each lie in a single plane. In order to accomplish this, a templet or jig 29 is clamped about the pipe by means of a screw 30 having right and left hand threads which screw into lugs 31 and 32 which are secured to the ends of the sheet metal jig 29. By turning the screw 30, the lugs 31 and 32 draw the two ends of the jig tightly about the pipe. A round wire bead 34 is secured by welding or brazing to the body of the jig 29 and engages a groove 25$^c$ in the member 25. It will thus be seen that as the cutters are rotated after having been properly adjusted by means of the screw 24, they will be guided about the pipe by the bead 34 and the groove 25$^c$ so as to make the first cut separating the sections A and B. The cutter 25 is raised and the severed end A inserted in the section B which is held rigid by the jig 29. The pipe is then reversed and the end section C is cut and edged in the same way and the end C inserted into the middle section B.

When the cuts are thus made it will be found that the outwardly turned edge of the member A can be inserted within the inwardly turned edge of the member B as shown in Fig. 3 by inserting one side first and rocking the other side into position about this first edge as a hinge. For some classes of work this will be sufficient to hold the parts together. In assembling them they are assembled in the same general position as that shown in Fig. 6. In order to make an elbow of them, each section is then turned 180 degrees with respect to the next adjacent section with the result shown in Fig. 7.

For other classes of work however it has been found necessary to further crimp or roll the engaging edges so as to increase the grip of each upon the other. For this purpose additional closing or crimping rollers 35 and 36 are keyed upon the shafts 11 and 37. The shaft 37 corresponds to the shaft 19 and is mounted and turned in a similar manner. Flanges $36^a$ and $36^b$ on the roller 36 are placed in staggered relation with the flanges $35^a$, $35^b$ and $35^c$ on the roller 35 and are spaced so as to engage the edges formed on the sections A and B so as to fold the inturned edge of the section B inwardly and the outwardly turned edge of section A outwardly, thereby making it much more difficult to separate these sections.

The flanges of the closing rollers thus follow the grooves formed in the pipe and no jig is required.

The jig 29 performs at least three functions, first, it holds the pipe rigidly in its cylindrical form and resists the tendency of the cutters to flatten it out; second, it guides the cutters as has been explained; and third, the friction between the track or bead 34 and the sides of the groove $25^c$ forces the metal of the pipe through the cutters.

Elbows may thus be made of any number of sections from three upwards. When a three-piece elbow is desired the jig 29 is formed with a track 34 at each end. A straight length of pipe is then made of the correct length to form all the sections and the jig clamped to the center of the pipe. The two cuts are then made one after the other by reversing the pipe and jig in the cutters. While the jig is still on the pipe the severed ends are inserted as it holds the pipe rigid.

It is also apparent that this machine may be used to cut flat sheet material by using a flat jig or templet of the desired shape which is secured to the flat sheet to be cut.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. A jig for use in cutting off lengths of pipe, comprising a band adapted to be placed about the pipe, means on the band for causing it to grip the pipe, and means on the band for guiding the cutters.

2. A jig for use in cutting off lengths of pipe, comprising a band adapted to be placed about the pipe, means for securing said band to the pipe, and means on the band for guiding the cutters.

3. A jig for use in cutting off lengths of pipe, comprising a band adapted to be placed about the pipe, means on the band for causing it to grip the pipe, and a track on the band for guiding the cutters.

4. A jig for use in cutting off lengths of pipe, comprising a band adapted to be placed about the pipe, means on the band for causing it to grip the pipe, said jig being cut at both ends on planes which diverge from a plane normal to the axis of the jig, and a track on each of said ends for guiding a cutter about said jig.

5. A jig for use in cutting off lengths in forming pipe elbow sections from straight lengths of pipe, said jig having a sheet-metal body, and a track adapted to cooperate with a pair of rotary cutters to guide them and to force them through the sheet metal of the pipe which is being cut.

LEMUEL H. PURNELL.